June 25, 1946.  F. G. LOGAN  2,402,563

ELECTRIC CONTROLLING APPARATUS

Filed May 23, 1944

INVENTOR.
FRANK G. LOGAN
BY
Lawrence K. Sager
his ATTORNEY

Patented June 25, 1946

2,402,563

UNITED STATES PATENT OFFICE 2,402,563

ELECTRIC CONTROLLING APPARATUS

Frank G. Logan, Mount Vernon, N. Y., assignor to Ward Leonard Electric Company, a corporation of New York Application May 23, 1944, Serial No. 536,859

8 Claims. (Cl. 320—28)

This invention relates particularly to electric controlling apparatus for the charging of automobile batteries although it is also adapted for charging batteries used for other purposes.

Apparatus of this character should charge the battery at a rate to maintain it charged under conditions of wide variations in speed of the engine which drives the generator, under wide changes in ambient temperatures and under a wide range of the electric load on the system. Also the charging of the battery should be accomplished without damage to the generator by seriously overloading it; and in case of a ground on the system or other abnormal condition, the generator should be disconnected from the battery. Furthermore, if the conditions become such that a reverse current beyond a predetermined amount passes from the battery to the generator, the generator should be disconnected therefrom and remain disconnected until the generator is able to supply a voltage of proper amount.

The main object of the present invention is to produce improved apparatus which will fulfill the above requirements in a satisfactory manner. Further objects are to provide a wide range of control of excitation of the generator and a prompt response and sensitiveness of the regulator to fulfill the requirements under wide changes of the variable conditions. By this invention the range of control of the generator field current may be in the ratio of 15 to 1, or even greater. Another important object is to accomplish the control by a single electromagnet which avoids the complexity of several interrelated units, reduces the cost of manufacture, reduces the space occupied, and simplifies the assemblage, installation, and maintenance of the parts in operating condition. A further object is to provide apparatus which will be dependable and durable in long continued use under the required exacting conditions. Other objects and advantages will be understood from the following description and accompanying drawing.

Figure 1:
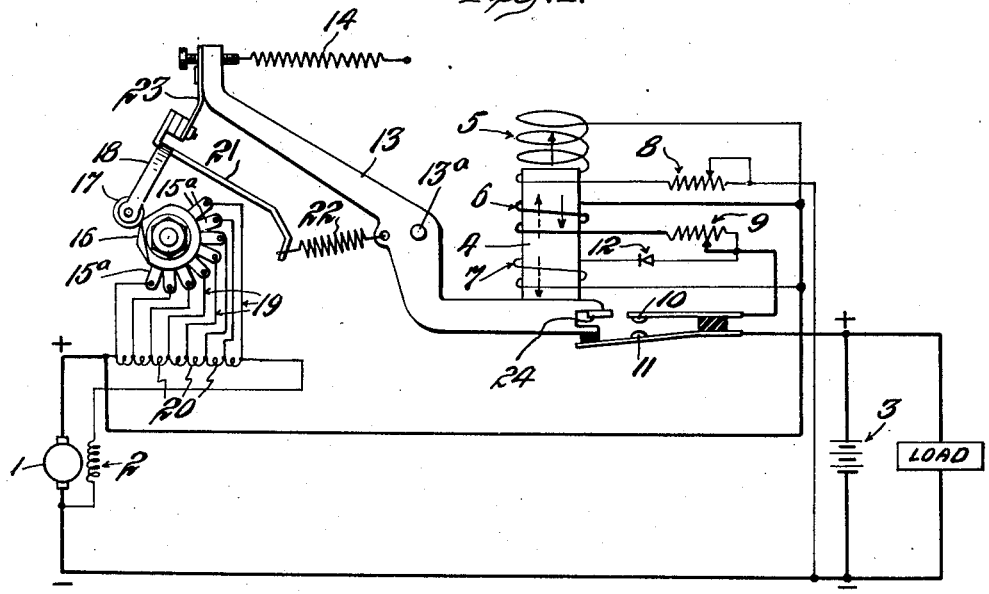
Figure 2:
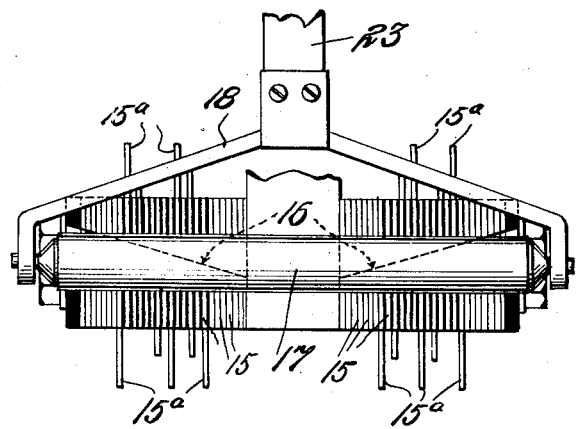

Fig. 1 is a diagram showing the salient features of one embodiment of the invention; and Fig. 2 is a front view of a portion of the resistance controller.

A direct current generator having an armature 1 and field winding 2, is driven by the automobile engine or by other power in case of use of the invention for other purposes. The generator supplies current to the battery 3. The load which may vary widely and comprises various devices is connected to the battery.

The controlling magnet is preferably of the iron-clad type and as it may be of any suitable form its structure is largely omitted for simplicity. It is indicated of the solenoid type having a movable core or plunger 4 controlled by the voltage or regulating winding 5, the series winding 6 and the reverse current winding 7. These windings are shown axially displaced about the core for clearness but it will be understood that they may be superimposed on each other and distributed in any suitable manner for obtaining the desired resultant control.

The regulating winding 5 is connected between the terminals of the generator armature through a resistive device 8 which may be adjustable. The series winding 6 is connected from one side of the generator armature marked plus through a resistive device 9, shown adjustable, to a contact 10 which is adapted to be engaged by a yieldably mounted contact 11. The latter is connected to a terminal of the battery indicated as the plus terminal. The other side of the battery is connected to the negative terminal of the generator.

The reverse current winding 7 is connected through a half wave rectifier or electric valve 12 in shunt to, or across the terminals of the circuit which includes the series winding 6 and resistive device 9. The valve 12 is preferably a dry disk rectifier. This valve permits current to pass through the winding 7 when current passes from the battery to the generator but otherwise the winding 7 has no controlling effect.

The lower end of the plunger 4 is fixed to one end of a lever 13 mounted on a fixed pivot 13a. This lever extends outwardly from the end of the plunger to provide space for the fixed frame of the magnet, then upwardly to the pivot and then outwardly. An adjustable spring 14 is secured to the outer upper end of the lever at one end and to a fixed portion of the magnet frame at its other end. This spring imposes a bias on the lever tending to hold the plunger 4 in its lowest position against a fixed stop 24 positioned between jaws extending from the end of the lever. In this lowest position the end of the lever engages, through intervening insulation, the yieldable support of the contact 11 to hold it out of engagement from the contact 10 as shown.

A resistance controlling device is indicated of the form shown in the patent of A. M. Cohen No. 2,340,579, granted February 1, 1944. It comprises a series of conducting disks 15, shown in Fig. 2, insulated from each other and mounted on a central longitudinal support. The disks are formed to provide a series of contact surfaces 16 which are of a wide open V formation and are engaged at opposite sides by a longitudinally extending contact bar or conducting roller 17. This is carried at its opposite ends by a bail 18. Each disk 15 is provided with a rearward extension 15a for convenient connection thereto of lead wires 19 connected to resistive elements 20 as shown in Fig. 1. A few only of such elements and connections are shown in Fig. 1 for clearness. These elements are connected in series with each other and in series with the field winding 2 across the armature of the generator. When the roller 17 is in its upper position, as shown in Fig. 1, it bridges the end contact disks and thereby short-circuits all of the resistance 20, giving the generator its highest field strength; and as the roller moves downwardly, it inserts more and more of the resistance 20 in the field circuit. At the lowest position of the roller, the generator is given its weakest field strength. The range of movement of the roller between limiting positions is comparatively small for securing the control from full field strength to a weak field; and as there are a multiplicity of contact disks and of the elements 20, the change between steps is slight giving close and accurate refinement of control with slight movement of the roller.

The arms of the bail 18 are formed with and extend downwardly from a strip of sheet metal 21 which extends inwardly. A spring 22 is secured to its inner end and to the lever 13 near its pivot. The front end of the strip 21 is bent upwardly and is fixed to the lower end of a flexible sheet metal strip 23, the upper end of which is fixed to the outer end portion of the lever 13. The strip 23 is of suitable material such as phosphor bronze and in effect forms a hinge for the roller supporting strip. The spring 22 serves to impose a proper pressure of the roller 17 against the inclined rows of contact surfaces 16 for insuring good electrical contact in each adjusted position of the roller.

The movable portion of the apparatus, including the lever 13, plunger 4, strip 21 and roller 17, is mechanically balanced on opposite sides of the pivot 13a. This prevents shocks and jars from interfering with the proper regulation and control of the parts in any position the apparatus may assume.

The windings of the magnet are connected in such relationship to each other that under normal charging conditions the magnetizing effect of the series winding 6 is in opposition to that of the regulating winding 5, as indicated by the full line arrows. When a reverse current passes from the battery to the generator, the magnetizing effect of the reverse current winding 7 is in opposition to that of the regulating winding as indicated by the dotted line arrow on the coil 7; and under this condition the magnetizing effect of the series winding 6 is additive to that of the regulating winding, as indicated by the dotted line arrow on the coil 6.

Fig. 1 shows the position of the parts when the generator is inactive or when operating at such a low speed that its voltage is less than that of the battery. The biasing spring 14 then holds the plunger in its unattracted position and the contact 11 out of engagement with the contact 10. This disconnects the battery from the generator. The bar or roller 17 is then in its uppermost position and all of the field resistance 20 is then short-circuited by the roller 17 bridging the contacts of the outer disks 15.

When the generator armature is driven, it gradually builds up its voltage to an amount which somewhat exceeds the normal battery voltage; and the regulating coil 5 attracts the plunger sufficiently in the initial portion of its movement to cause the switch contact 11 to engage the contact 10. This closes the circuit to the battery and a charging current passes thereto. The magnet is designed to be highly sensitive and quickly responsive to slight changes in the voltage of the generator; and any small increase above the normal voltage will cause the roller 17 to move downwardly and insert more of the resistance in the field of the generator to maintain the voltage within close limits of the desired amount. If the voltage falls below normal value, the reduced attraction of the regulating coil on the plunger will cause the resistance controller to move slightly upward and thereby strengthen the field of the generator. As already explained, the change of the field resistance by comparatively small movement of the controller is quite pronounced giving a prompt and effective response to wide variations of the speed of the generator and to changes of load on the system. Adjustment of the resistance takes place only when change of conditions require it and under steady conditions of speed and load, the regulator remains in a position of adjustment corresponding to the required conditions of the variable factors. During the normal regulating action, the contacts 10 and 11 remain closed because the movement of the plunger for obtaining regulation under normal conditions is not sufficient to separate these contacts. The magnetizing effect of the current in the series winding 6 is in opposition to the regulating winding 5 under charging conditions so that the flux of the magnet is the resultant effect of the regulating winding and of the series winding; but the magnetizing effect of the regulating winding predominates over that of the series winding; the latter having comparatively few turns.

In case the load on the generator becomes abnormally high so that if continued it would damage the generator, as in the case of a short-circuit or ground on the system, the current in the series winding increases to an abnormal amount and so reduces the magnetizing effect of the regulating winding that the spring 14 will overpower the attractive force of the magnet and swing the lever to the position shown in Fig. 1 and thereby open the contacts of the switch connecting the battery to the generator. This, of course, takes the load off the generator; and when the regulating coil again attracts the plunger to close the charging circuit, any excessive load current through the series winding will cause the immediate opening again of the charging circuit. This opening and closing of the switch will continue until the load on the system is reduced, or the cause of the overload removed. In the meantime the generator is protected from continuous overload by the intermittent action which serves as a warning to the operator that the cause of the overload should be corrected. However, the intermittent opening and closing of the circuit serves to maintain the system in operation until the cause of the trouble can be corrected, and in some cases may result in the burning out of a short-circuit and thereby automatically correct the fault.

During the above described actions, the reverse current winding 7 has no effect because no current can pass through the rectifier or valve 12 when the charging current is passing to the battery. If however a fault occurs, or the conditions become such that the generator does not supply a charging current to the battery, a reverse current will flow from the battery to the generator. This reverses the current in the series winding 6 and in view of the fact that the winding 7 and its rectifier is in shunt to the series winding and its resistance device 9, when the latter is used, a reverse current will pass through the winding 7 which tends to demagnetize the magnet. The winding is so proportioned to the other windings that when the reverse current exceeds a predetermined amount such as to be objectionable in discharging the battery, the magnetizing effect of the reverse current coil 7 becomes sufficiently great to permit the spring 14 to move the lever and plunger from the operating condition to the position shown in Fig. 1 and thereby separate the contact 11 from the contact 10. The battery is thereby disconnected from the generator and protected from undesirable discharge therefrom. This condition will usually arise when the speed of the generator is so low that it cannot maintain a charging voltage under the full field strength adjustment of the resistance control. The charging of the battery cannot be resumed after opening of the charging switch until the speed of the generator has increased to a speed sufficient to bring up its voltage slightly above the battery voltage and to an amount sufficient to cause the plunger of the magnet to be attracted sufficiently to permit the closing of the contacts 10 and 11. The normal charging and regulating action will then continue under normal conditions of operation.

It is apparent that this improvement by the use of a single controlling magnet serves to protect the generator from objectionable overloads, maintains a proper charging voltage under normal operating conditions within close limits by a pronounced corrective factor with comparatively small movement of the plunger of the magnet and protects the battery from objectionable discharge when the generator cannot maintain a normal charging voltage. Thus by a single controlling unit, the apparatus is simplified and the complication and care of several interrelated units for accomplishing the same result is avoided. Likewise the structure may be formed to occupy small space and may be readily installed or replaced as a single unit complete in itself.

Although a particular embodiment of the invention has been disclosed, it will be understood that modifications thereof may be made without departing from the scope of the invention and for adaptation to particular conditions.

I claim:

1. Controlling apparatus for a generator for charging a battery comprising a magnet having a regulating winding connected to the armature of the generator, said magnet having a reverse current winding having a magnetizing effect in opposition to that of the regulating winding upon the passage of a current from the battery to the generator, an electric valve connected in the circuit of the reverse current winding for permitting passage of current therethrough only when the battery discharges to the generator, and a switch in series in the circuit between the battery and the generator automatically opened by said magnet when the current in the reverse current winding is sufficiently high.

2. Controlling apparatus for a generator for charging a battery comprising a magnet having a regulating winding connected to the armature of the generator, said magnet also having a series winding connected in the circuit between the battery and the generator and having its magnetizing effect in opposition to that of the regulating winding upon the passage of a charging current, said magnet also having a reverse current winding in the charging circuit having a magnetizing effect in opposition to that of the regulating winding when current passes from the battery to the generator, means in the circuit of the reverse current winding for permitting the passage of current therethrough only when current passes from the battery to the generator, and a switch in the charging circuit automatically opened by the magnet when the charging current in said series winding is sufficiently high and also automatically opened by the magnet when the discharge current from the battery to the generator is sufficiently high.

3. Controlling apparatus for a generator for charging a battery comprising a magnet having a regulating winding connected to the armature of the generator, said magnet also having a series winding connected in the circuit between the battery and the generator and having its magnetizing effect in opposition to that of the regulating winding upon the passage of a charging current, said magnet also having a reverse current winding in the charging circuit having a magnetizing effect in opposition to that of the regulating winding when current passes from the battery to the generator, means in the circuit of the reverse current winding for permitting the passage of current therethrough only when current passes from the battery to the generator, and a switch in the charging circuit automatically opened by the magnet when the charging current in said series winding is sufficiently high and also automatically opened by the magnet when the discharge current from the battery to the generator is sufficiently high, said switch being automatically closed by the action of the magnet when the generator voltage exceeds the battery voltage.

4. Controlling apparatus for a generator for charging a battery comprising a magnet having a regulating winding connected to the armature of the generator, a pivoted lever controlled by said winding, an adjustable step by step resistance device having a movable contact element controlled by the movement of said lever for variably controlling the generator field, said lever and contact element being mechanically balanced about the pivot of said lever, and a switch in the charging circuit of the generator and battery actuated to open position by movement of said lever to its unattracted position and moved to closed position upon the generator voltage attaining a value slightly above the voltage of the battery.

5. Controlling apparatus for a generator for charging a battery comprising a magnet having a regulating winding connected to the armature of the generator, a switch in the charging circuit of the generator and battery biased to closed position and held in open position by the biased position of the movable element of said magnet when unattracted and permitted to close upon the initial portion of the movement of said movable element upon the generator voltage slightly exceeding the battery voltage, and adjustable step by step resistance controlling means for variably regulating the field strength of the generator upon variable movement of said movable element in a region beyond the movement for permitting closing of said switch, said switch being automatically opened by movement of said movable element when the magnetization of the magnet is reduced below a certain amount.

6. Controlling apparatus for a generator for charging a battery comprising a magnet having a regulating winding, a pivoted lever having a portion at one side of the pivot adapted to be attracted by said magnet, a movable contact element carried by a portion of the lever on the other side of said pivot, a step by step resistance device variably controlled by said contact element for variably regulating the field strength of the generator upon variable movement of said lever as controlled by said magnet, and a switch in the charging circuit of the generator and battery controlled to move to closed position by the initial portion of the movement of said lever from its unattracted position.

7. Controlling apparatus for a generator for charging a battery comprising a magnet having a regulating winding, a pivoted lever having a portion at one side of the pivot adapted to be attracted by said magnet, a movable contact element carried by a portion of the lever on the other side of said pivot, a step by step resistance device variably controlled by said contact element for variably regulating the field strength of the generator upon variable movement of said lever as controlled by said magnet, and a switch in the charging circuit of the generator and battery biased to closed position and held open by said lever when said lever is in its unattracted position and permitted to close upon the initial portion of the movement of said lever from its unattracted position.

8. Controlling apparatus for a generator for charging a battery comprising a magnet having a voltage winding connected to the armature of the generator, a switch in the charging circuit automatically moved to closed position by said voltage winding upon the generator voltage attaining a value slightly above the voltage of the battery, said magnet also having a series winding connected in the charging circuit, the magnetizing effect of said series winding being in opposition to that of said voltage winding during the passage of a charging current for automatically causing the intermittent opening of said switch when closed by said voltage winding when the load current on the generator becomes unduly high.

FRANK G. LOGAN.